US007413128B2

(12) United States Patent
Waldo et al.

(10) Patent No.: US 7,413,128 B2
(45) Date of Patent: Aug. 19, 2008

(54) COLLECTIBLE CARD WITH INSERT

(75) Inventors: Ramirez Waldo, Carlsbad, CA (US); Kiskis Jamie, San Diego, CA (US)

(73) Assignee: The Upper Deck Company, North Las Vegas, NV (US)

( * ) Notice: Subject to any disclaimer, the term of this patent is extended or adjusted under 35 U.S.C. 154(b) by 0 days.

(21) Appl. No.: 10/940,096

(22) Filed: Sep. 14, 2004

(65) Prior Publication Data

US 2006/0054706 A1 Mar. 16, 2006

(51) Int. Cl.
*G06K 19/00* (2006.01)

(52) U.S. Cl. ...................................... 235/486; 235/487

(58) Field of Classification Search ................. 235/487, 235/486
See application file for complete search history.

(56) References Cited

U.S. PATENT DOCUMENTS

| | | | | | |
|---|---|---|---|---|---|
| 4,213,531 | A | * | 7/1980 | Rae | 206/463 |
| 5,025,580 | A | | 6/1991 | Asai | |
| 5,159,964 | A | * | 11/1992 | Baker et al. | 150/147 |
| 5,215,792 | A | * | 6/1993 | Miller | 428/14 |
| 5,238,345 | A | * | 8/1993 | D'Andrea | 412/4 |
| 5,245,775 | A | * | 9/1993 | Goserud | 40/654.01 |
| 5,259,136 | A | * | 11/1993 | Goserud | 40/654.01 |
| 5,287,641 | A | * | 2/1994 | Showers | 40/488 |
| 5,328,207 | A | | 7/1994 | Hannah | |
| 5,417,431 | A | | 5/1995 | Gluck | |
| 5,462,167 | A | * | 10/1995 | Polinski et al. | 206/455 |
| 5,522,163 | A | * | 6/1996 | Neugebauer | 40/780 |
| 5,752,336 | A | * | 5/1998 | Haynes | 40/323 |
| 5,845,778 | A | * | 12/1998 | Hickey, Jr. | 206/459.5 |
| 6,082,774 | A | | 7/2000 | Schlauch | |
| 6,128,840 | A | * | 10/2000 | Boisvert | 40/124.191 |
| 6,170,881 | B1 | | 1/2001 | Salmon et al. | |
| 6,186,403 | B1 | * | 2/2001 | Ozbey et al. | 235/487 |
| 6,442,879 | B1 | * | 9/2002 | Callendar et al. | 40/800 |
| 6,447,079 | B1 | * | 9/2002 | Irwin | 312/118 |
| 6,554,193 | B1 | * | 4/2003 | Fehrman et al. | 235/488 |
| 6,682,624 | B2 | * | 1/2004 | Schlier | 156/230 |
| 6,845,585 | B2 | * | 1/2005 | Callander et al. | 40/800 |
| 7,048,307 | B1 | * | 5/2006 | Scarbrough et al. | 283/41 |
| 2002/0108286 | A1 | * | 8/2002 | Brockley et al. | 40/800 |
| 2004/0060211 | A1 | * | 4/2004 | Thomas et al. | 40/124.11 |
| 2006/0043679 | A1 | * | 3/2006 | Fallon et al. | 273/292 |

FOREIGN PATENT DOCUMENTS

| | | | | |
|---|---|---|---|---|
| JP | 11078303 | A | * | 3/1999 |
| JP | 2002283772 | A | * | 10/2002 |

* cited by examiner

*Primary Examiner*—Uyen-Chau N Le
(74) *Attorney, Agent, or Firm*—Steven G. Roeder; James P. Broder

(57) ABSTRACT

A collectible card (10) includes a base (12), an insert (14) and a cover layer (16) that is secured to the base (12). The base (12) includes a base recess (243) that receives the insert (14). The cover layer (16) includes a cover layer aperture (234) through which at least a portion of the insert (14) is exposed. The base recess (243) has a first configuration and the cover layer aperture (234) has a second configuration that is different than the first configuration. In one embodiment, the cover layer aperture (234) has an area that is less than the area of the base recess (243). Further, the insert (14) can be substantially non-planar and can form an insert cavity (246) positioned directly between a portion of the insert (14) and a portion of the base (12).

25 Claims, 3 Drawing Sheets

COLLECTIBLE CARD WITH INSERT

BACKGROUND

Sports memorabilia such as collectible trading cards have become increasingly popular in recent years. Unfortunately, these types of trading cards are typically formed from relatively thin, fragile cardstock that is susceptible to damage from a number of factors. As a result of moisture, sun, handling and friction, these cards can become flimsy, bent, torn, smeared or faded. Consequently, the monetary value of these cards often decreases over time, and the inherent value is also impacted due to the degraded appearance of the cards.

SUMMARY

The present invention is directed toward a collectible card that includes a base, an insert and a cover layer. The cover layer is secured to the base. The base can include a base recess and the insert can be positioned within the base recess. The base recess can have a first configuration. The cover layer can include a cover layer aperture having a second configuration that is different than the first configuration. In one embodiment, the cover layer aperture has an area that is less than the area of the base recess.

The insert is at least partially exposed through the cover layer aperture. In one embodiment, the insert is formed substantially from a metallic material. Further, the insert can be substantially non-planar and can thereby form an insert cavity positioned directly between a portion of the insert and a portion of the base. Additionally, the cover layer can conceal at least a portion of the insert, thereby at least partially inhibiting removal of the insert from the base recess.

The present invention is also directed toward a method for manufacturing a collectible card.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
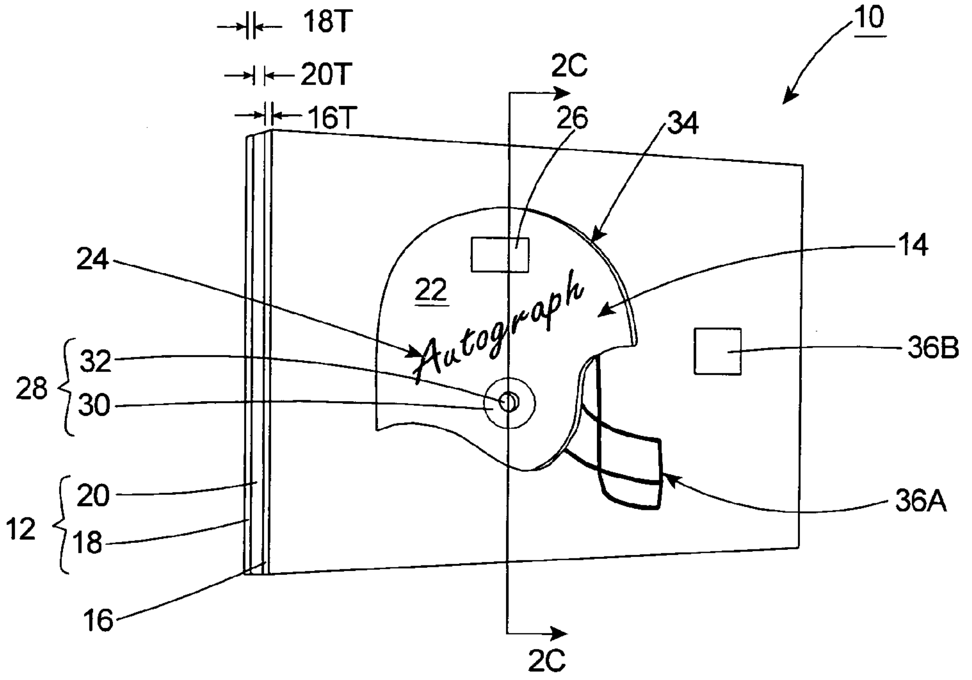
FIG. 1 is a perspective view of a collectible card having features of the present invention.

FIG. 1 is a perspective view of one embodiment of a collectible card 10 (also herein referred to simply as a "card") having features of the present invention. It is recognized that although the card 10 illustrated in the Figures includes subject matter indicative of sports, and in particular football, the card 10 can include any suitable type of subject matter including other sports or non-sports related subject matter. Stated another way, the card 10 provided in the Figures is representative only, and is not intended to limit the scope of the present invention in any manner. Further, the collectible card 10 described herein can be used for various purposes. For example, the card 10 can be a sports trading card, a playing card, a collectible card or a greeting card, as non-exclusive examples. The design of the card 10 can vary widely.

In the embodiment illustrated in FIG. 1, the card 10 includes a base 12, an insert 14 and a cover layer 16. In this embodiment, the base 12 includes a base layer 18 and a card body 20. The base layer 18 can be substantially planar and flat, and can provide a surface to which the card body 20 and/or the insert 14 can be secured. Alternatively, the base layer 18 can be concave, convex, or it can be in another non-planar configuration. In one embodiment, the base layer 18 can be formed from a cardstock material or other paper products. Alternatively, the base layer 18 can be formed from various plastic materials, metal, epoxy, glass, ceramic, composites or any other suitable material or combination of materials.

The card body 20 can be secured to the base layer 18 using an adhesive material or by any other suitable method. In one embodiment, the card body 20 has a thickness 20 T that is substantially greater than a thickness 18 T of the base layer 18. Alternatively, the thickness 20 T of the card body 20 can be the same or less than the thickness 18 T of the base layer 18. Further, the card body 20 can be formed from a relatively rigid material that can be the same as or different from the material used to form the base layer 18. For example, the card body 20 can be formed from various plastic materials, metal, epoxy, glass, ceramic, composites or any other suitable material or combination of materials.

The insert 14 is secured to the base layer 18 and/or the card body 20 using any suitable materials such as an adhesive material. In one embodiment, the insert 14 can be formed from a relatively rigid material such as metal. In alternative embodiments, the insert 14 can be formed from various plastic materials, epoxies, glass, ceramic, composites or any other suitable material or combination of materials. Further, the material used to form the insert 14 can be a material that is conducive to receiving ink or other similar markings typically used for autographs and the like.

The shape of the insert 14 can vary depending upon the design requirements of the card 10. For example, in the embodiment illustrated in FIG. 1, the insert 14 can include an exposed surface 22 having a shape like a football helmet worn by a football player. Alternatively, the exposed surface 22 of the insert 14 can have a shape of other types of sporting equipment including head gear that is worn by a sportsperson, such as a baseball helmet, baseball cap, a hockey mask, or other sports head gear, uniforms or clothing, as representative, non-exclusive examples.

In one embodiment, the insert 14 can include one or more indicia that at least partly identifies a sportsperson. For example, in the embodiment illustrated in FIG. 1, the insert 14 can include a first indicia 24 that includes an autograph or other handwritten indicia by a sportsperson who may be the subject of the card 10. The first indicia 24 can be an actual, authentic signature of the sportsperson, or the first indicia 24 can be painted, printed, inlayed, molded, embossed, embroidered, etched or electroplated onto the exposed surface 22. Alternatively, the first indicia 24 can be formed or positioned on the exposed surface 22 in any other suitable manner.

The insert 14 can also include a second indicia 26 that can identify a specific sports team, country, region or other identifying mark. For example, in the embodiment illustrated in FIG. 1, the second indicia 26 (indicated by a rectangle) can be a symbol, insignia, mascot, logo or other indicia that identifies the team for whom the sportsperson plays. The second indicia 26 can include animate or inanimate objects. For illustrative purposes only, the second indicia 26 can include a lightning bolt, a star, a "G", a lion or team lettering, as non-exclusive examples. Further, the second indicia 26 can be painted, printed, inlayed, molded, embossed, embroidered, etched or electroplated onto the exposed surface 22, or can be formed or positioned on the exposed surface 22 in any other suitable manner.

Additionally, the insert 14 can include one or more surface features 28. In the embodiment illustrated in FIG. 1, the insert 14 includes surface features 28 having a raised region 30 that is somewhat circular, and an insert aperture 32 that extends through the raised region 30 of the insert 14. More specifically, the surface feature 28 illustrated in FIG. 1 is that is an ear hole in a football helmet. In alternative embodiments, the surface feature 28 can include one or more indentations, projections, raised or depressed areas, or other types of physical deviations or features that are formed as part of the insert 14. Still alternatively, the surface feature 28 can include a separate structure (not shown) that is secured to the exposed surface 22 of the insert 14.

The cover layer 16 can be secured to the body layer 20. As illustrated in the embodiment shown in FIG. 1, the cover layer 16 includes a cover layer aperture 34 through which the exposed surface 22 of the insert 14 is visible. In this embodiment, the cover layer aperture 34 is somewhat helmet shaped. However, the cover layer aperture 34 can have any suitable shape depending upon the design requirements, including the shape, size and/or subject matter, of the card 10 and/or the insert 14.

Further, the cover layer 16 can have cover layer indicia 36A-B that can be related to the subject matter and/or shape of the cover layer aperture 34. For example, in the embodiment illustrated in FIG. 1, one of the cover layer indicia 36A includes an image of a facemask that is visually (but not actually, in this embodiment) connected to the shape of the cover layer aperture 34 and the exposed surface 22 of the insert 14. By including a portion of a football helmet on the exposed surface 22 of the insert 14, and another portion of the football helmet on the cover layer 16, the card 10 can have three-dimensional qualities and can appear more realistic.

The cover layer 16 can also have one or more additional cover layer indicia 36B (represented as a rectangle for simplicity) such as images of a sports figure or other types of images, statistics, team names and/or logos, and any other relevant data or information. In the event the card 10 is a non-sports related trading card or playing card, the cover layer indicia 36B can include any information, data, images, or any other indicia that is pertinent. Alternatively, the cover layer 16 can have cover layer indicia 36A-B that are strictly decorative.

In one embodiment, the cover layer 16 can have a thickness 16 T that is similar to the thickness 18 T of the base layer 18. However, in alternative embodiments, depending upon the desired effect, the thickness 16 T of the cover layer 16 can be greater or less than the thickness 18 T of the base layer 18.

Figure 2A:
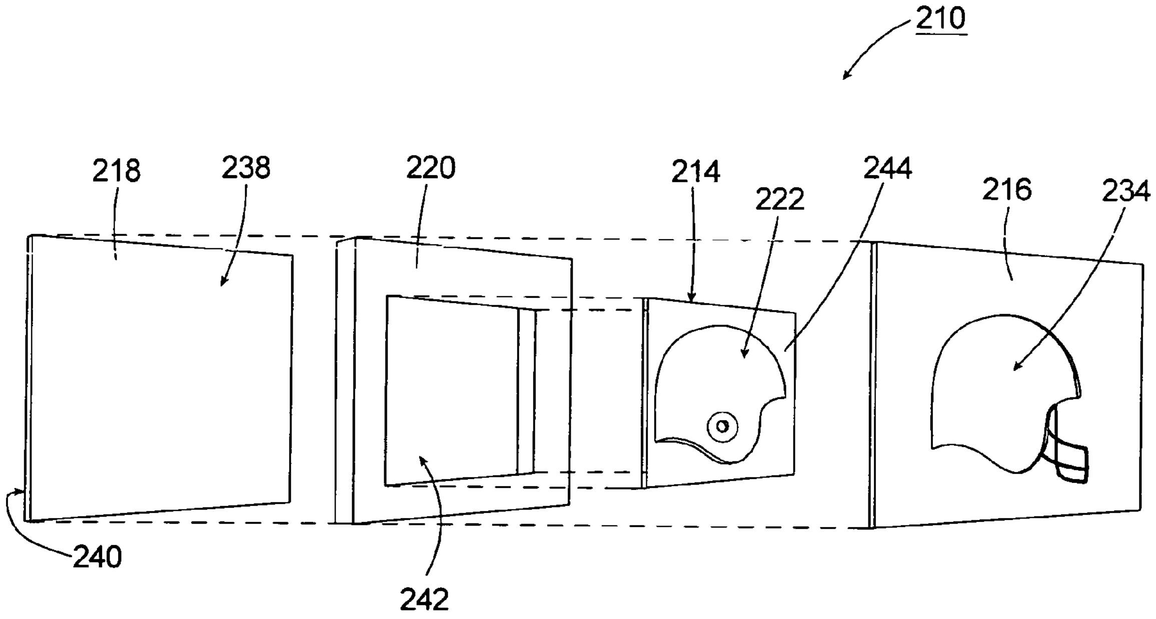
FIG. 2A is an exploded view of one embodiment of the collectible card illustrated in FIG. 1.

FIG. 2A is an exploded view of one embodiment of a card 210 that includes (i) a base having a base layer 218 and a card body 220, (ii) an insert 214, and (iii) a cover layer 216. The base layer 218 can be substantially similar to the base layer 18 previously-described. In this embodiment, the base layer 218 can have an interior base surface 238 and an opposing exterior base surface 240 that generally faces away from the interior base surface 238. The insert 214 can be secured to the interior base surface 238. The exterior base surface 240 can have images, statistics or other information and/or data that depend on the design requirements of the card 210.

The card body 220 can be substantially similar to the card body 20 previously described herein. In this embodiment, the card body 220 can be secured to the base layer 218, and can include one or more body apertures 242. The card body 220 and the base layer 218 together form a base recess 243 (best illustrated in FIG. 2B). The shape of the base recess 243 can vary depending upon the shape of the body aperture(s) 242. In the embodiment illustrated in FIG. 2A, the body aperture 242 is substantially rectangular. However, any of the body apertures 242 can be round, oval, triangular or any other suitable configuration.

In one embodiment, the thickness of the card body 220 is at least as great as the thickness of the insert 214. With this design, the card body 220 can at least partially protect the insert 214 from damage due to stacking multiple cards 210 on top of each other. In an alternative embodiment, the insert 214 can have a thickness that is greater than the thickness of the card body 220.

The insert 214 can be positioned within the base recess 243 formed by the base layer 218 and the card body 220 so that the insert 214 is adhered or otherwise secured to the interior base surface 238 of the base layer 218. Thus, in this embodiment, the shape of a perimeter of the insert 214 is slightly smaller than the body aperture 242. Alternatively, the perimeter of the insert 214 can be substantially smaller than the shape of the body aperture 242.

In this embodiment, the insert 214 includes an exposed surface 222 and a concealed surface 244. As used herein, the concealed surface 244 is defined as being substantially obscured from view when observing the card 210 in a "plan view" manner, so that an observer substantially faces the cover layer 216 and the exposed surface 222 of the insert 214 while viewing the card 210.

In one embodiment, the exposed surface 222 is non-planar and three-dimensional. For example, the exposed surface 222 can have a somewhat convex or concave curvature to provide a more realistic appearance. However, the exposed surface 222 can have any suitable configuration depending upon the desired effect of the insert 214 and the card 210.

The concealed surface 244 can be generally planar, and can be the portion of the insert 214 that is secured to the base layer 218. In the embodiment illustrated in FIG. 2A, the concealed surface 244 is substantially concealed by the cover layer 216 when the card 210 is fully constructed so that only the exposed surface 222 of the insert 214 is visible. Thus, the concealed surface 244 can provide a relatively large surface area of the insert 214 for securing the insert 214 to the base layer 218, which reduces the likelihood of the insert 214 coming loose.

Further, the cover layer 216 inhibits the insert 214 from being unintentionally removed from the card 210 because the cover layer aperture 234 can have a smaller footprint than a footprint of the insert 214, allowing the cover layer 216 to effectively hold the insert 214 in place within the card 210. Stated another way, in one embodiment, the cover layer aperture 234 has a different shape than the body aperture 242 (which receives the insert 214), permitting viewing of a three-dimensional portion of the insert 214 through the cover layer 216, while maintaining positioning of the insert 214 within the base recess 243 of the card 210 for protection of the insert 214 and the first indicia 24 (illustrated in FIG. 1, for example) appearing on the insert 214.

Figure 2B:
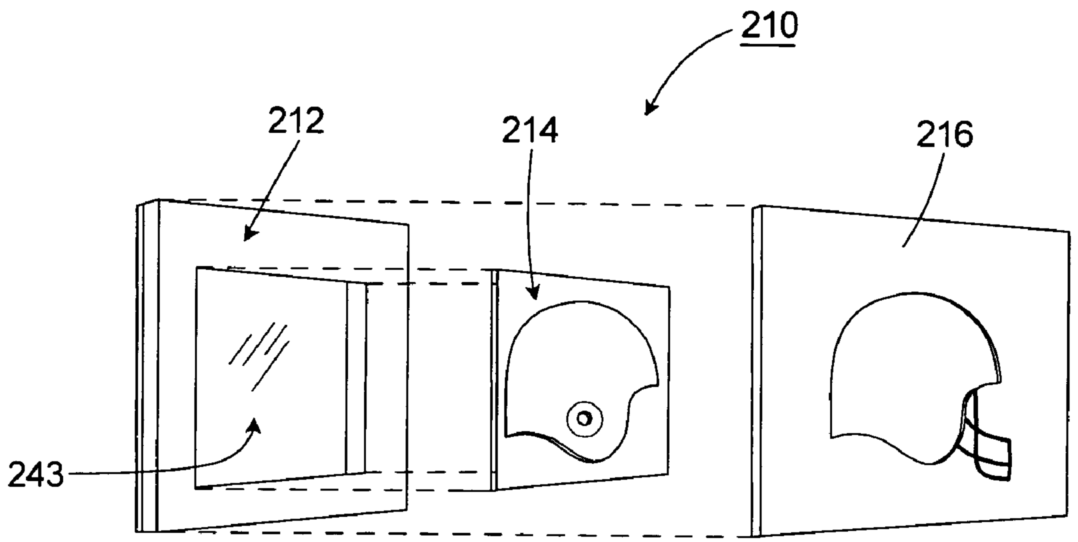
FIG. 2B is an exploded view of another embodiment of the collectible card illustrated in FIG. 1.

FIG. 2B is an exploded view of another embodiment of a card 210 that includes a base 212, an insert 214 and a cover layer 216. In this embodiment, instead of securing a separate card body 220 (illustrated in FIG. 2A) to a base layer 218 (illustrated in FIG. 2A), the base 212 is formed as a single, one-piece unit. Other than this construction, the base 212 can be substantially similar to the combined base layer 218 and card body 220 previously described.

Figure 2C:
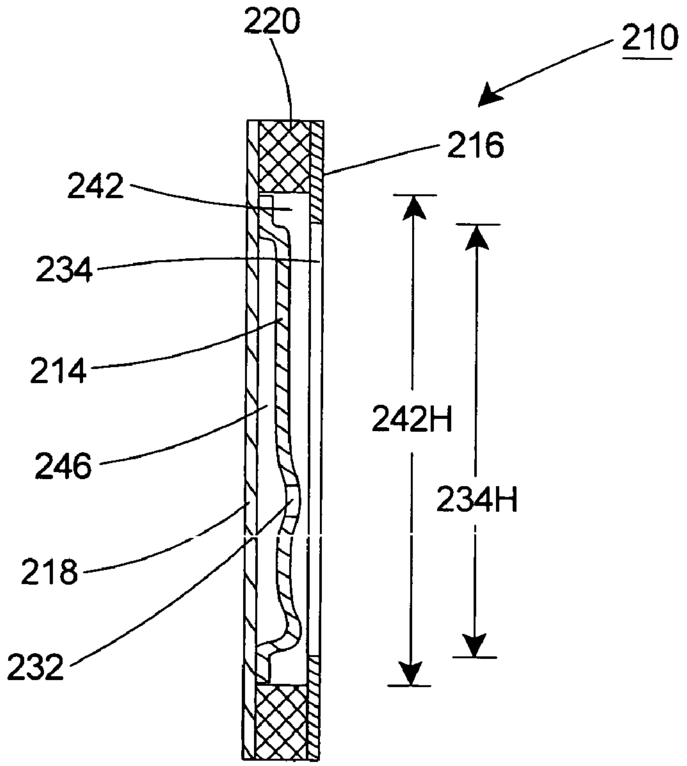
FIG. 2C is a cross-sectional view taken on line 2C-2C of the card illustrated in FIG. 1.

FIG. 2C is a cross-sectional view of one embodiment of the card illustrated in FIG. 1. FIG. 2C shows that at least a portion of the cover layer aperture 234 has a height 234H that is different than a corresponding height 242H of the body aperture 242 taken at the same sectional location. In the embodiment illustrated in FIG. 2C, the height 234H of the cover layer aperture 234 is less than the height 242H of the body aperture 242.

Somewhat similarly, other dimensions of the cover layer aperture 234 can differ from the dimensions of the body aperture 242. For example, the area of the cover layer aperture 234 is different than the area of the body aperture 242. More specifically, in one embodiment, the area of the cover layer aperture 234 is less than the area of the body aperture 242. In alternative embodiments, the area of the cover layer aperture 234 can be the same or greater than the area of the body aperture 242, but other dimensions between the cover layer aperture 234 and the body aperture 242 can differ. With several of these designs, the insert 214 will be partially exposed and partially concealed, thereby providing the benefits described herein.

FIG. 2C also illustrates that the insert 214 can form an insert cavity 246 between a portion of the insert 214 and the base layer 218 in a fully constructed card 210. The insert aperture 232 allows pressure equilibration between the insert cavity 246 and the atmosphere to inhibit deformation of the card 210 during atmospheric pressure changes. Further, the insert cavity 246 decreases the overall weight of the card 210, while still providing the requisite strength and durability to last for many years. Moreover, the somewhat convex configuration of the insert 214 structurally inhibits bending of the insert 214, and thus the card 210, allowing a collector to maintain the structural integrity of the card 210 for a longer period of time.

Figure 3A:
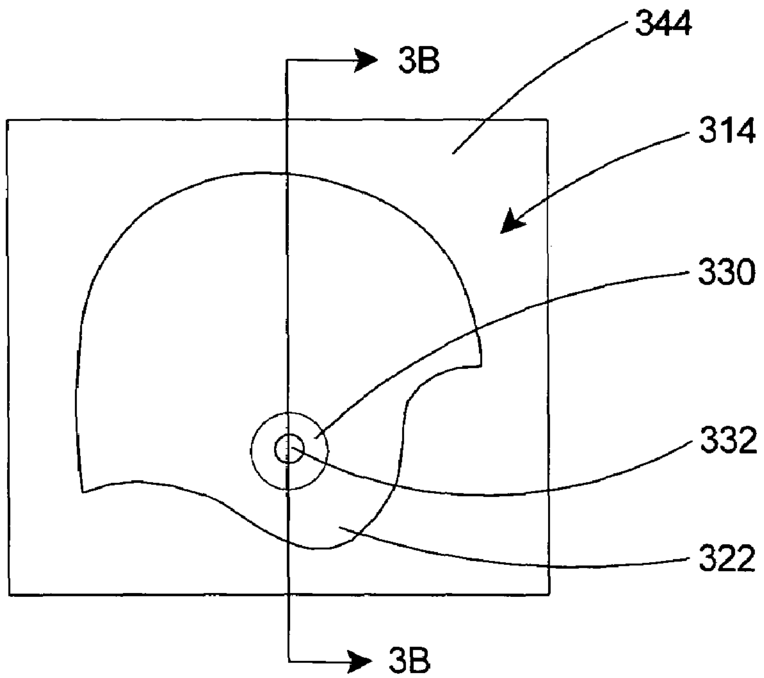
FIG. 3A is a top view of a portion of the collectible card including an insert.

FIG. 3A is a top view of an insert 314 which includes an exposed surface 322 and a concealed surface 344. In this embodiment, the exposed surface 322 has a three-dimensional appearance, and includes a raised region 330 and an insert aperture 332. The concealed surface 344 is substantially flat to better allow the insert to be secured to the base layer 218 (illustrated in FIG. 2A) or the base 212 (illustrated in FIG. 2B).

Figure 3B:
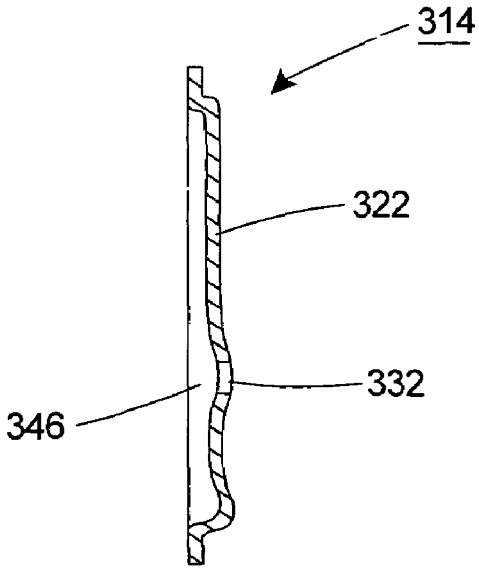
FIG. 3B is a cross-sectional view of the insert illustrated in FIG. 3A.

FIG. 3B is a cross-sectional view of the insert 314 illustrated in FIG. 3A. FIG. 3B better shows the three-dimensional nature of the exposed surface 322 of the insert 314. Further, in this embodiment, the insert 314 is substantially hollow, thereby providing an insert cavity 346 between a portion of the insert 314 and the base 212 in a fully constructed card 10. The insert aperture 332 allows pressure equilibration between the insert cavity 346 and the atmosphere to inhibit deformation of the card 310 during atmospheric pressure changes. Further, the insert cavity 346 decreases the overall weight of the card 310, while still providing the requisite strength and durability to last for many years. Moreover, the somewhat convex configuration of the insert 314 structurally inhibits bending of the insert 314, and thus the card 310, allowing a collector to maintain the structural integrity of the card 310 for a longer period of time.

In an alternative embodiment, the insert 314 can be formed as a solid material so that no insert cavity 346 is formed, while still providing a three-dimensional insert 314.

While the particular collectible card 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A collectible card comprising:

a base including a base recess having a first configuration;

an insert that is positioned within the base recess, the insert having a shape that is representative of a portion of a piece of sports equipment; and a cover layer that is coupled to the base, the cover layer including a cover layer aperture having a second configuration that is different than the first configuration, the insert being at least partially exposed through the cover layer aperture; wherein the base, the insert, and the cover layer are fixedly secured together to form the collectible card having the size and shape of the collectible card.

2. The collectible card of claim 1 wherein the base includes a base layer and a card body secured to the base layer, the card body including a body aperture having a shape of the first configuration.

3. The collectible card of claim 1 wherein the insert is formed substantially from a metallic material.

4. The collectible card of claim 1 wherein the insert is substantially non-planar and includes an insert cavity positioned directly between a portion of the insert and the base layer.

5. The collectible card of claim 1 wherein the cover layer conceals at least a portion of the insert.

6. The collectible card of claim 1 wherein the second configuration has an area that is smaller than the first configuration.

7. The collectible card of claim 1 wherein the cover layer at least partially inhibits removal of the insert from the base recess.

8. The collectible card of claim 1 wherein the insert includes an insert aperture.

9. The collectible card of claim 1 wherein the insert includes indicia that is indicative of a sports team.

10. The collectible card of claim 9 wherein the insert has a shape that is representative of a portion of a sports team uniform.

11. A collectible card comprising:

a base including a base layer and a base recess;

a cover layer that is coupled to the base; and an insert that is positioned in the base recess and at least partially between the base layer and the cover layer, the insert being substantially non-planar and having a shape that is representative of a portion of a piece of sports equipment, the insert forming an insert cavity that substantially faces the base layer; wherein the base, the insert, and the cover layer are fixedly secured together to form the collectible card having the size and shape of the collectible card.

12. The collectible card of claim 11 wherein the base recess has a first configuration, and wherein the cover layer includes a cover layer aperture having a second configuration that is different than the first configuration.

13. The collectible card of claim 12 wherein the second configuration has an area that is smaller than the first configuration.

14. The collectible card of claim 12 wherein the cover layer at least partially inhibits removal of the insert from the base recess.

15. The collectible card of claim 11 wherein the insert is formed substantially from a metallic material.

16. The collectible card of claim 11 wherein the cover layer conceals at least a portion of the insert.

17. The collectible card of claim 11 wherein the insert includes an insert aperture.

18. A collectible card of a sportsperson, comprising:

a base including a base layer and a base recess;

a cover layer that is coupled to the base; and an insert that is positioned in the base recess and at least partially between the base layer and the cover layer, the insert being substantially non-planar and formed in the shape of a first portion of a head gear adapted to be worn by the sportsperson; wherein the base, the insert, and the cover layer are fixedly secured together to form the collectible card having the size and shape of the collectible card.

19. The collectible card of claim 18 wherein the cover layer includes an indicia of a second portion of the head gear that combines with the first portion of the head gear to form an entire head gear adapted to be worn by the sportsperson.

20. The collectible card of claim 19 wherein the head gear is a sports helmet.

21. The collectible card of claim 18 wherein the insert forms an insert cavity that substantially faces the base layer.

22. The collectible card of claim 18 wherein the base recess has a first configuration, and wherein the cover layer includes a cover layer aperture having a second configuration that is different than the first configuration.

23. A method for manufacturing a collectible card, the method comprising the steps of:

positioning an insert within a base recess of a base, the base recess having a first configuration, the insert having a shape that is representative of a portion of a piece of sports equipment;

covering a portion of the base recess with a cover layer, the cover layer having a cover layer aperture with a second configuration that is different than the first configuration;

exposing at least a portion of the insert through the cover layer aperture; and adhering the base, the insert, and the cover layer together to form the collectible card having the size and shape of the collectible card.

24. The method of claim 23 wherein the second configuration has an area that is less than the first configuration.

25. The method of claim 23 wherein the step of positioning an insert includes providing a non-planar insert that forms an insert cavity when positioned within the base recess of the base.

* * * * *